US011128376B1

United States Patent
Passe et al.

(10) Patent No.: US 11,128,376 B1
(45) Date of Patent: Sep. 21, 2021

(54) DATA COMMUNICATION WITH LIGHT IN CONTROLLED ENVIRONMENT FACILITIES

(71) Applicant: Securus Technologies, Inc., Carrollton, TX (US)

(72) Inventors: Scott D. Passe, Forney, TX (US); Kendrick Sims, Mansfield, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 16/283,732

(22) Filed: Feb. 22, 2019

(51) Int. Cl.
| | |
|---|---|
| *H04B 10/27* | (2013.01) |
| *H04B 10/116* | (2013.01) |
| *H04B 10/50* | (2013.01) |
| *H04B 10/114* | (2013.01) |
| *H04B 7/024* | (2017.01) |

(52) U.S. Cl.
CPC ............ *H04B 10/27* (2013.01); *H04B 7/024* (2013.01); *H04B 10/116* (2013.01); *H04B 10/1143* (2013.01); *H04B 10/502* (2013.01); *H04B 10/506* (2013.01)

(58) Field of Classification Search
None
See application file for complete search history.

(56) References Cited

U.S. PATENT DOCUMENTS

| | | | | |
|---|---|---|---|---|
| 2006/0056855 A1* | 3/2006 | Nakagawa | ......... | H04B 10/1149 398/183 |
| 2008/0310850 A1* | 12/2008 | Pederson | ................. | H04B 3/54 398/135 |
| 2014/0128021 A1* | 5/2014 | Walker | .............. | H04W 52/0212 455/405 |
| 2015/0147067 A1* | 5/2015 | Ryan | ....................... | H04L 67/12 398/118 |

FOREIGN PATENT DOCUMENTS

CN          106341186 A  *  1/2017  ........... H04B 10/116

OTHER PUBLICATIONS

Haas, Harald, "LiFi is a paradigm-shifting 5G technology," Reviews in Physics 3, 2018, pp. 26-31, published by Elsevier BM.
Serafimovski, Nikola, et al., "An overview on high speed optical wireless/light communications," document: IEEE 802.11-17/0962r2, Jul. 3, 2017, 64 pages, published by IEEE.
Uysal, Murat, et al., "IEEE 802.11bb Reference Channel Models for Vehicular Communications," document: IEEE 11-18-1237-01-00bb, Jul. 6, 2018, 23 pages, published by IEEE.
(Continued)

*Primary Examiner* — Darren E Wolf
(74) *Attorney, Agent, or Firm* — Fogarty LLP (57) ABSTRACT

Systems and methods for communicating using both radio frequency (RF) communication and light communication (LC) are disclosed. An example device comprises radio frequency communication circuitry, a light communication transmitter; a light communication receiver; a processor for controlling the device according to executable code; and memory for storing data and executable code, wherein the executable code comprises instructions for causing the processor to establish RF communication with an RF access point using the RF communication circuitry; and to establish LC communication with an LC access point using the LC transmitter, the LC receiver, or both.

12 Claims, 4 Drawing Sheets

(56) References Cited

OTHER PUBLICATIONS

Williams, Allison, "Say HI to LI-FI ," Popular Science, Jul./Aug. 2016, 1 page.
PURELIFI, "High pertormance wireless for 5G and beyond," LiFi-XC—Products & Components, 2019, 9 pages, published by pureLiFi, downloaded from https://purelifi.com/lifi-products/.
PURELIFI, "LiFi Technology," 2019, 9 pages, published by pureLiFi, downloaded from https://purelifi.com/lifi-technology/.

* cited by examiner

DATA COMMUNICATION WITH LIGHT IN CONTROLLED ENVIRONMENT FACILITIES

BACKGROUND

Correctional facilities, such as prisons and jails, usually allow residents (i.e., inmates) to communicate with family, friends, attorneys, and others outside the facility to allow the residents to maintain personal connections and to facilitate their transition back into society upon release. Most controlled-environment facilities allow some form of telephone calls, in-person visitation, video visitation, etc. for such communication. Traditional visitation sessions provided by controlled-environment facilities include telephone calls and in-person visits. Technological advances have allowed controlled-environment facilities to provide other types of monitored visitation sessions, including audio conferences, video conferences, video messages, email, and online chat sessions. Visitation sessions may be conducted via portable communications devices issued to residents on a temporary or permanent basis.

In addition to providing increased opportunities for visitations, additional services may be provided to residents via an issued portable communications device. For instance, a portable communications device may provide residents with educational and counseling services. A portable communications device may also be used to provide residents with entertainment services, such as gaming services and access to digital content. The availability of such services may be limited based on bandwidth limitations within a controlled-environment facility. In many scenarios, the demand for wireless bandwidth within a controlled-environment facility far exceeds the bandwidth that is actually available. These bandwidth limitations are magnified as greater numbers of portable communications devices are issued. Additionally, due to the movable nature of portable communications devices, correctional facilities may need to control where residents are able to use such devices.

SUMMARY

The present invention is directed to systems and methods for communicating using both radio frequency and light communications. An example device comprises radio frequency (RF) communication circuitry, a light communication (LC) transmitter; an LC receiver; a processor for controlling the device according to executable code; and memory for storing data and executable code, wherein the executable code comprises instructions for causing the processor to establish RF communication with an RF access point using the RF communication circuitry; and to establish LC communication with an LC access point using the LC transmitter, the LC receiver, or both.

The LC transmitter may be a Light Emitting Diode (LED). The LC receiver may be a photodetector. The LC communication may be established using a visible light spectrum, an invisible light spectrum, or both.

The executable code may further comprise instructions for causing the processor to identify a current location of the device based upon communication with the LC access point. The executable code may further comprise instructions for causing the processor to enable and/or disable one or more selected applications on the device based upon the current location.

The executable code may further comprise instructions for causing the processor to generate a transmission from the device to report the current location to a remote device.

The executable code may further comprise instructions for causing the processor to periodically update the current location of the device based upon communication with the LC access point.

The executable code may further comprise instructions for causing the processor to establish a session with a remote device using the RF communication with the RF access point, and exchange session data with the remote device using the LC communication with the LC access point. The executable code may further comprise instructions for causing the processor to establish a session with a remote device using the LC communication with the LC access point, and exchange session data with the remote device using the RF communication with the RF access point. The executable code may further comprise instructions for causing the processor to establish a session with a remote device, and exchange session data with the remote device using both the LC communication with the LC access point and the RF communication with the RF access point. The session and session data may be associated with one or more of video visitation, email, messaging, gaming, and entertainment applications on the wireless device.

The executable code may further comprise instructions for causing the processor to load balance session data between the LC communication and the RF communication based upon currently available bandwidth on LC channels and RF channels.

An example method comprises identifying a current location of a wireless device based upon light communication with an LC access point and modifying an RF communication by the device based upon the current location. Modifying RF communication by the device may comprise, for example, enabling and/or disabling one or more selected applications on the device based upon the current location.

The method may further comprise establishing a session between the wireless device and a remote device and exchanging session data with the remote device using both the LC communication with the LC access point and the RF communication with an RF access point.

The method may further comprise load balancing the session data between the LC communication and the RF communication based upon currently available bandwidth on LC channels and RF channels.

The wireless device may be configured for use in a controlled-environment facility, and the controlled-environment facility may have a plurality of separate LC-accessible zones. The method may further comprise identifying a specific LC-accessible zone in which the wireless device is located. Each LC-accessible zone may be supported by a different LC access point. Two or more LC-accessible zones may overlap at least in part.

The method may further comprise tracking the wireless device across a plurality of locations, wherein each of the plurality of locations are associated with a different LC access point light transmitter. The method may further comprise generating an alert when the wireless device is not authorized for operation in the current location and/or when a current user of the wireless device is not authorized in the current location.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. The drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates generally to controlled-environment facilities and, more specifically, to providing wireless communications in such facilities. As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents. Moreover, the systems and methods described herein may be used to support communications in other facilities that have fewer or no access restrictions.

Figure 1:
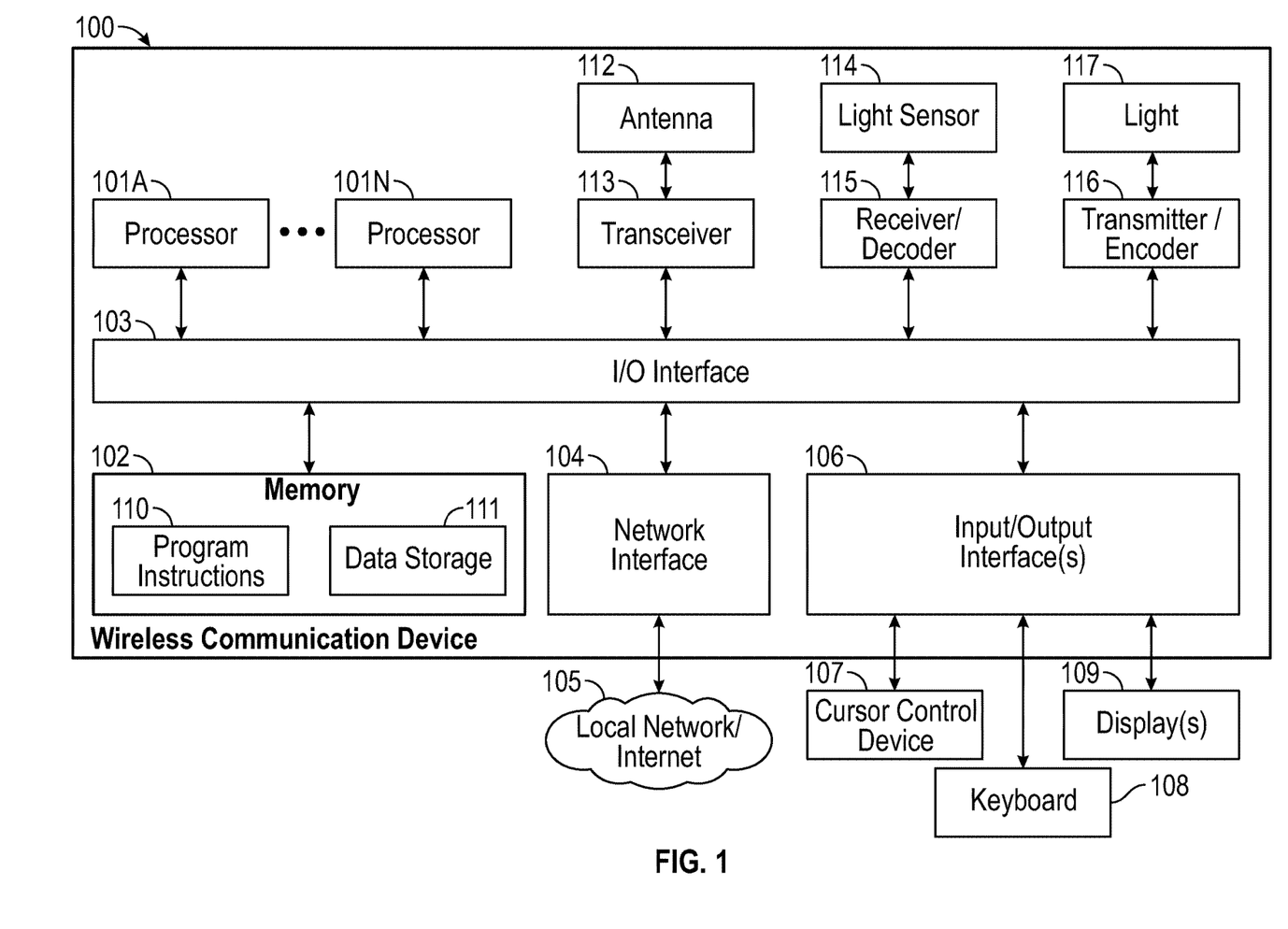
FIG. 1 is a block diagram illustrating a wireless communication device according to an example embodiment.

Embodiments of the present systems and methods for providing wireless communications, as described herein, may be implemented or executed, at least in part, by one or more computer systems. FIG. 1 is a block diagram depicting a wireless communication device 100 according to an example embodiment. As illustrated, wireless communication device 100 includes one or more processors 101A-N coupled to a system memory 102 via bus 103. Wireless communication device 100 may further include a network interface 104 coupled to bus 103. Network interface 104 may provide a wired connection to an external network 105, which may provide communication connections to other systems, servers, and networks. One or more input/output (I/O) controllers 106 are coupled to peripheral devices, such as a cursor control device 107 (e.g., a mouse, touchpad, or stylus), keyboard 108, display(s) 109, etc. Each of devices 107, 108, and 109 may be a separate component that is capable of communicating with I/O controller 106 via a wired connection (e.g., serial port, Universal Serial Bus port) or wireless connection (e.g., Wi-Fi, Bluetooth, Near Field Communications Link, etc.). Other devices, such as microphones, speakers, scanners, printers, or peripheral devices, may also be coupled to I/O controller 106. In other embodiments, one or more of devices 107, 108, and 109 may be an integral component of wireless communication device 100.

In various embodiments, wireless communication device 100 may be a single-processor system including one processor 101A, or a multi-processor system including two or more processors 101A-N (e.g., two, four, eight, or more processors). Processors 101 may be any processor capable of executing program instructions. For example, in various embodiments, processors 101A-N may be general-purpose or embedded processors implementing any of a variety of Instruction Set Architectures (ISAs), such as the x86, PowerPC®, ARM®, SPARC®, or MIPS® ISAs, or any other suitable ISA. In multi-processor systems, each of processors 101A-N may commonly, but not necessarily, implement the same ISA. Also, in some embodiments, at least one processor 101 may include a Graphics Processing Unit (GPU) or another dedicated graphics-rendering device.

System memory 102 may be configured to store program instructions and/or data accessible by processor 101. In various embodiments, system memory 102 may be implemented using any suitable memory technology, such as Static Random-Access Memory (SRAM), Synchronous Dynamic RAM (SDRAM), nonvolatile/Flash-type memory, or any other type of memory. As illustrated, program instructions and data implementing certain operations and modules such as those described herein may be stored within system memory 102 as program instructions 110 and data storage 111, respectively. In other embodiments, program instructions and/or data may be received, sent, or stored upon different types of computer-accessible media or on similar media separate from system memory 102.

A computer-accessible medium may include any tangible and/or non-transitory storage media or memory media such as electronic, magnetic, or optical media—e.g., disk or CD/DVD-ROM coupled to wireless communication device 100 via bus 103. The terms "tangible" and "non-transitory,"

as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, Random Access Memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

System memory 102 may include program instructions 110, configured to implement certain embodiments described herein, and data storage 111, comprising various data may be accessible by program instructions 110. Program instructions 110 may be implemented in various embodiments using any desired programming language, scripting language, or combination of programming languages and/or scripting languages (e.g., C, C++, C#, Java™, JavaScript™, Perl, etc.). Data storage 111 may include data that may be used in these embodiments (e.g., recorded communications, profiles for different modes of operations, etc.). In other embodiments, other or different software elements and data may be included.

In an embodiment, bus 103 may be configured to coordinate I/O traffic between processor 101, system memory 102, and any other devices in the system, including network interface 104 or other interfaces, such as I/O interfaces 106. In some embodiments, bus 103 may perform any necessary protocol, timing, or other data transformations to convert data signals from one component (e.g., system memory 102) into a format suitable for use by another component (e.g., processor 101). In some embodiments, bus 103 may include support for devices attached through various types of peripheral buses, such as a variant of the Peripheral Component Interconnect (PCI) bus standard or the Universal Serial Bus (USB) standard, for example. In some embodiments, the function of bus 103 may be split into two or more separate components, such as a northbridge chipset and a southbridge chipset, for example. In addition, in some embodiments some or all the functionality of bus 103, such as an interface to system memory 102, may be incorporated directly into processor(s) 101A-N.

Network interface 104 may be configured to allow data to be exchanged between wireless communication device 100 and other devices attached to a network, such as other computer systems, or between nodes of wireless communication device 100. In various embodiments, network interface 104 may support communication via wired or wireless general data networks, such as any suitable type of Ethernet network, for example, via telecommunications/telephony networks such as analog voice networks or digital fiber communications networks, via storage area networks such as Fibre Channel SANs, or via any other suitable type of network and/or protocol.

I/O interfaces 106 may, in some embodiments, enable communications with one or more display terminals, keyboards, keypads, touchpads, scanning devices, voice or optical recognition devices, mobile devices, or any other devices suitable for entering or retrieving data by one or more wireless communication device 100. Multiple I/O controllers 106 may be present in wireless communication device 100 or may be distributed on various nodes of wireless communication device 100. In some embodiments, I/O devices may be separate from wireless communication device 100 and may interact with one or more nodes of wireless communication device 100 through a wired or wireless connection, such as over network interface 104.

Wireless communication device 100 may support wireless communications via radio frequency (RF) and/or light communication (LC) channels. RF communication may be supported, for example, by antenna 112 and transceiver 113, which may be configured to support any RF interface to a Wireless Local Area Network (WLAN), such as connections based on Wi-Fi, Bluetooth, ZigBee, WiMAX, Near-field communication (NFC), or other communication protocols or standards. In other embodiments, antenna 112 and transceiver 113, which may be configured to support any 2G, 3G, 4G and/or 5G cellular technologies and related protocols that are used by wireless service providers. For example, wireless communication device 100 may be used with any current, legacy, or future cellular technology or protocols, such as Global System for Mobile Communications (GSM), Code-Division Multiple Access (CDMA), General Packet Radio Service (GPRS), cdmaOne, CDMA2000, Evolution-Data Optimized (EV-DO), Enhanced Data Rates for GSM Evolution (EDGE), Long Term Evolution (LTE), Universal Mobile Telecommunications System (UMTS), OpenG technology to improve mobile coverage and capacity inside buildings, Citizens Broadband Radio Service (CBRS), or Digital Enhanced Cordless Telecommunications (DECT), that may be defined by the 3rd Generation Partnership Project (3GPP), all open LTE bands on unlicensed spectrum or any other telecommunications standard development organization.

LC may be supported using a light sensor 114 and a receiver/decoder 115 to receive data and a transmitter/encoder 116 and light transmitter 117 to transmit data. Light sensor 114 may be, for example, a camera, image sensor, or photodetector, such as a Complementary Metal Oxide Semiconductor (CMOS) sensor or other electronic chip that converts photons to electrons for digital processing. Light sensor 114 detects light and generates an electronic signal for receiver/decoder 115, which extracts data bits that are carried by the light. The extracted bits may carry information that can be used by processors 101A-N. Data can also be sent using LC by encoding data bits using transmitter/encoder 116 into a signal that drives light transmitter 117, which then broadcasts the information as light signals. Any information that can be exchanged over traditional RF data channels can also be exchanged over LC channels, such as digital bit streams, packet data, voice, video, text, or other content. Although the example wireless communication device 100 depicts a system having both transmit and receive capabilities for light communications, it will be understood that in other embodiments only LC transmit components (i.e., transmitter/encoder 116 and light transmitter 117) or only LC receive components (i.e., light sensor 114 and receiver/decoder 115). Such single-direction LC systems may be used, for example, when the wireless communication device 100 only needs to transmit or only needs to receive data via an LC channel.

Light transmitter 117 may be a Light Emitting Diode (LED), for example. Light sensor 114 and light transmitter 117 may use invisible (e.g., infrared) and/or visible light spectrum for high speed data communication. The total size of the infrared and visible light spectrum is approximately 2600 times the size of the entire radio frequency spectrum of 300 GHz. LEDs have been shown to enable data rates up to 5 Gbps with peak transmission speeds of 8 Gbps using with a single LED. Data rates higher than 100 Gbps are feasible with laser-based lighting. Accordingly, LC can vastly extend the available bandwidth for wireless communication device 100. Communication protocols available for LC may be referred to as Light Fidelity (Li-Fi) or Optical Wireless Communication (OWC) and may be defined in IEEE 802.11bb, IEEE 802.15.7m, 802.15.13, or other standards.

Wireless communication device 100 may be embodied, for example, as a cellular telephone, mobile telephone, smartphone, cellular-enabled smartwatch, tablet computer, portable personal computer, laptop computer, cellular modem, or other device that supports wireless communication. Wireless communication device 100 may be addressed and/or identified using, for example, International Mobile Equipment Identifier (IMEI), Mobile Subscriber Integrated services Digital Network Number (MSIDN), Mobile Equipment IDentifier (MEID), Equipment Serial Numbers (ESN), International Mobile Subscriber Identity (IMSI), Temporary Mobile Subscriber Identity (TMSI), telephone number, Internet Protocol (IP) address, Media Access Control (MAC) address, or the like.

A person of ordinary skill in the art will appreciate that wireless communication device 100 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein may be implemented in software executed by processing circuitry, hardware, or a combination thereof. The order in which each operation of a given method is performed may be changed, and various operations may be added, reordered, combined, omitted, modified, etc. It is intended that embodiment(s) described herein do not embrace all such modifications and changes and, accordingly, the above description should be regarded in an illustrative rather than a restrictive sense.

A person of ordinary skill in the art will appreciate that wireless communication device 100 is merely illustrative and is not intended to limit the scope of the disclosure described herein. The device may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 2:
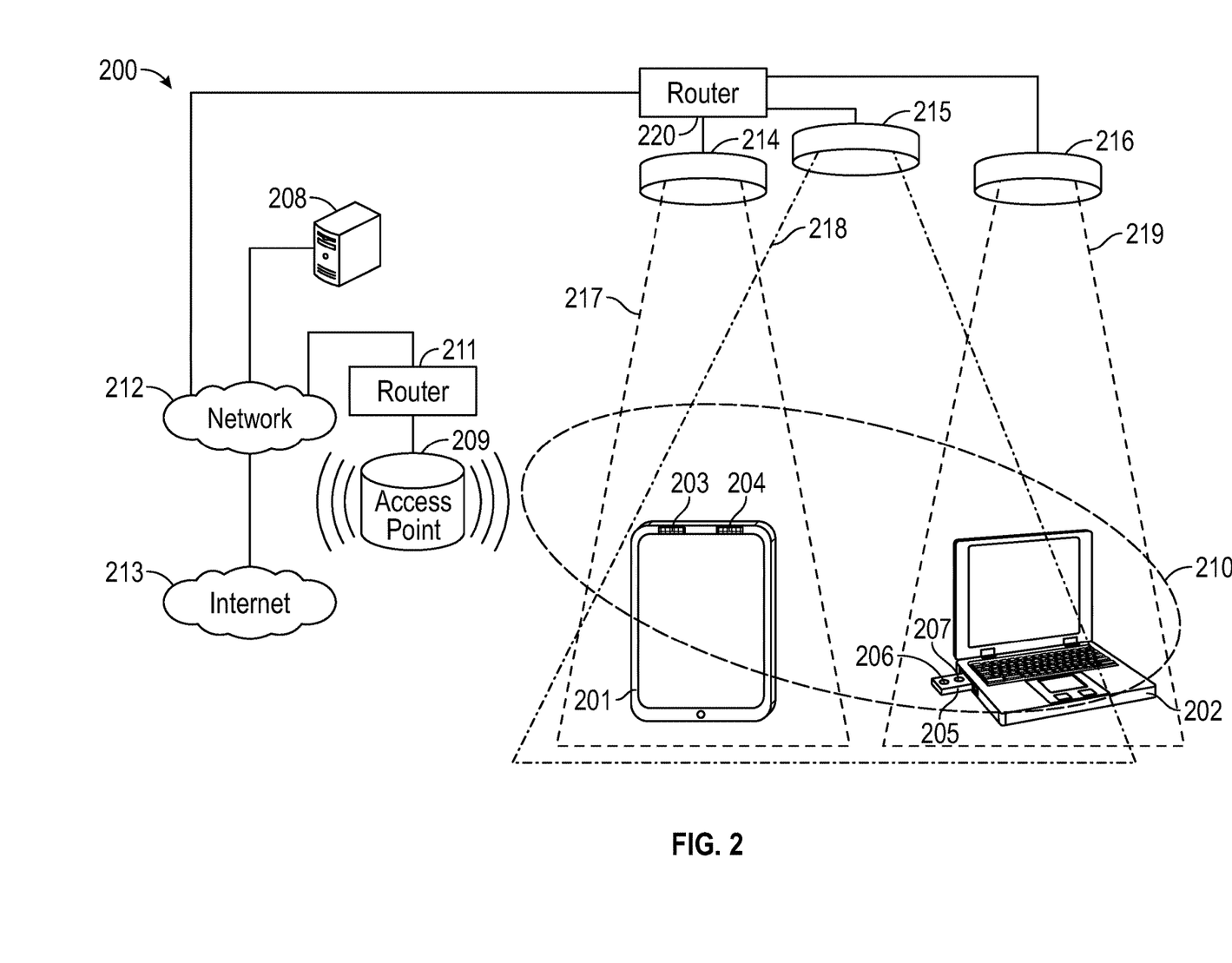
FIG. 2 depicts an example system for using wireless communication devices and that are capable of both RF and LC communication.

FIG. 2 depicts an example system 200 for using wireless communication devices 201 and 202 that are capable of both RF and LC communication. Device 201 may be a tablet computer or smart phone, for example, that has an internal RF antenna (not shown) and an embedded LC sensor 203 and LC transmitter 204. Device 202 may be a laptop computer, for example, that has an internal RF antenna (not shown) and uses an internal (not shown) or external LC communication device 205. External LC communication device 205 may connect directly to device 202, such using as a dongle that plugs into a USB or other port on device 202, or may connect remotely via a cable or wireless connection. External LC communication device 205 has an LC sensor 206 and an LC transmitter 207. Typically, an RF antenna may be an internal component because the case or housing of devices 201 and 202 are transparent to RF signals. On the other hand, LC sensors 203, 206 (e.g., cameras or photodetectors) and LC transmitters 204, 207 (e.g., lights) need to be exposed to remote light sources and sensors.

Devices 201 and 202 may communicate with each other and with other devices, such as remote server 208, using RF and/or LC networks. Remote server may support certain applications, provide streaming content, store data, or host other services of interest to devices 201 and 202. In an example embodiment, RF communications are supported using an RF access point 209 that services a limited area or cell (e.g., microcell or picocell) 210. A device 201, 202 must have the appropriate RF capabilities (e.g., Wi-Fi, Bluetooth, etc.) and be within area 210 in order to communicate with RF access point 209. Service area 210 may include a region that surrounds RF access point 209 (e.g., 360 degrees of coverage) or may be limited to a specific sector, such as by using beamforming in RF access point 209. Additionally, the range that service area 210 extends from RF access point 209 may be determined by the signal power provided from RF access point 209. Once communication is established with RF access point 209, the devices 201, 202 can communicate with each other or with remote server 208 via router 211 and network 212. Router 211 may be coupled to additional access points (not shown) to provide additional service areas or cells within a home, office building, campus, complex, or facility. Network 212 may be a local area network for a home, enterprise, or service provider. Network 212 may be coupled to additional networks, such as Internet 213, which may allow devices 201 and 202 to access remote public or private networks, servers, and devices.

In one embodiment, LC is supported using LC access points 214, 215, 216. Each LC access point 214, 215, 216 services its own limited area or attocell 217, 218, 219, respectively. A device 201, 202 must have the appropriate LC capabilities (e.g., photodetector and light transmitter) and be within an attocell 217, 218, or 219 in order to communicate with one of LC access points 214, 215, or 216. Attocells 217, 218, and 219 have a specific coverage area that is limited by the region covered by light from each LC access point 214, 215, or 216. In the example depicted in FIG. 2, LC access points 214 and 216 are spotlights that create narrow attocells 217 and 219. On the other hand, LC access point 215 broadcasts a diffuse light pattern that covers a broad area as illustrated by attocell 218. Narrow attocells 217 and 219 may be focused on particular locations, such as a particular seat, desk, kiosk, bed, or other tightly restricted location. Broad attocell 218 may provide coverage over a large area, such as an entire room, conference table, vehicle, or other open space. Once communication is established with an LC access point 214, 215, and/or 216, devices 201, 202 can communicate with each other and/or with remote server 208 via router 220 and network 212. Router 211 may be coupled to additional LC access points (not shown) to provide additional attocells within a home, office building, campus, complex, or facility. LC access point 214, 215, and/or 216 provide access to additional networks, such as Internet 213, through network 212.

It will be understood that the term "access point" as used herein comprises any device or base station that transmits and/or receives data over wireless communication channels in radio frequency, visible light communication, and/or invisible light communication (which may include infrared light communication) bands. The access point functions as a gateway or portal that allows wireless devices to connect to a wired and/or wireless network. The access point may communicate with one or more wireless devices.

Device 201 is located within both narrow attocell 217 and broad attocell 218 and, therefore, may communicate with LC access point 214 and/or 215. However, device 201 is located outside attocell 219, which prevents communication with LC access point 216. Similarly, device 202 is located within both narrow attocell 219 and broad attocell 218 and, therefore, may communicate with LC access point 216 and/or 215. However, device 202 is located outside attocell 217, which prevents communication with LC access point 214. The ability to narrowly focus the coverage for the attocells 217 and 219 allows system 200 to specifically target selected locations or devices. For example, if devices 201 and 202 are in the same room, LC access point 215 may be used to communicate with both devices as long as their respective LC sensor 203, 206 and LC transmitter 204, 207 are exposed to light broadcast in attocell 218. Alternatively, or additionally, each device 201 and 202 may be individually targeted for communication using LC access points 214 and 216. Since LC sensor 203 and LC transmitter 204 on device 201 are exposed to light broadcast in attocell 217, then device 201 may communicate using LC access point 214. The LC sensor 206 and LC transmitter 207 on device 202 are not exposed to light in attocell 217 and, therefore, device 202 cannot communicate using LC access point 214. The opposite is true for device 202, which is capable of communicating using LC access point 216 since it is exposed to light in attocell 219, but unable to communicate with LC access point 214 since device 202 is not exposed to light in attocell 217.

The LC sensor and LC transmitter components on the same device may operate in the same or different frequency bands. For example, both may operate in a visible light band or an infrared light band, or one component may operate in a visible light band while the other component operates in the infrared light band. Sub frequencies of the visible light band and infrared light band may also be identified and assigned to different components to avoid interference.

Figure 3:
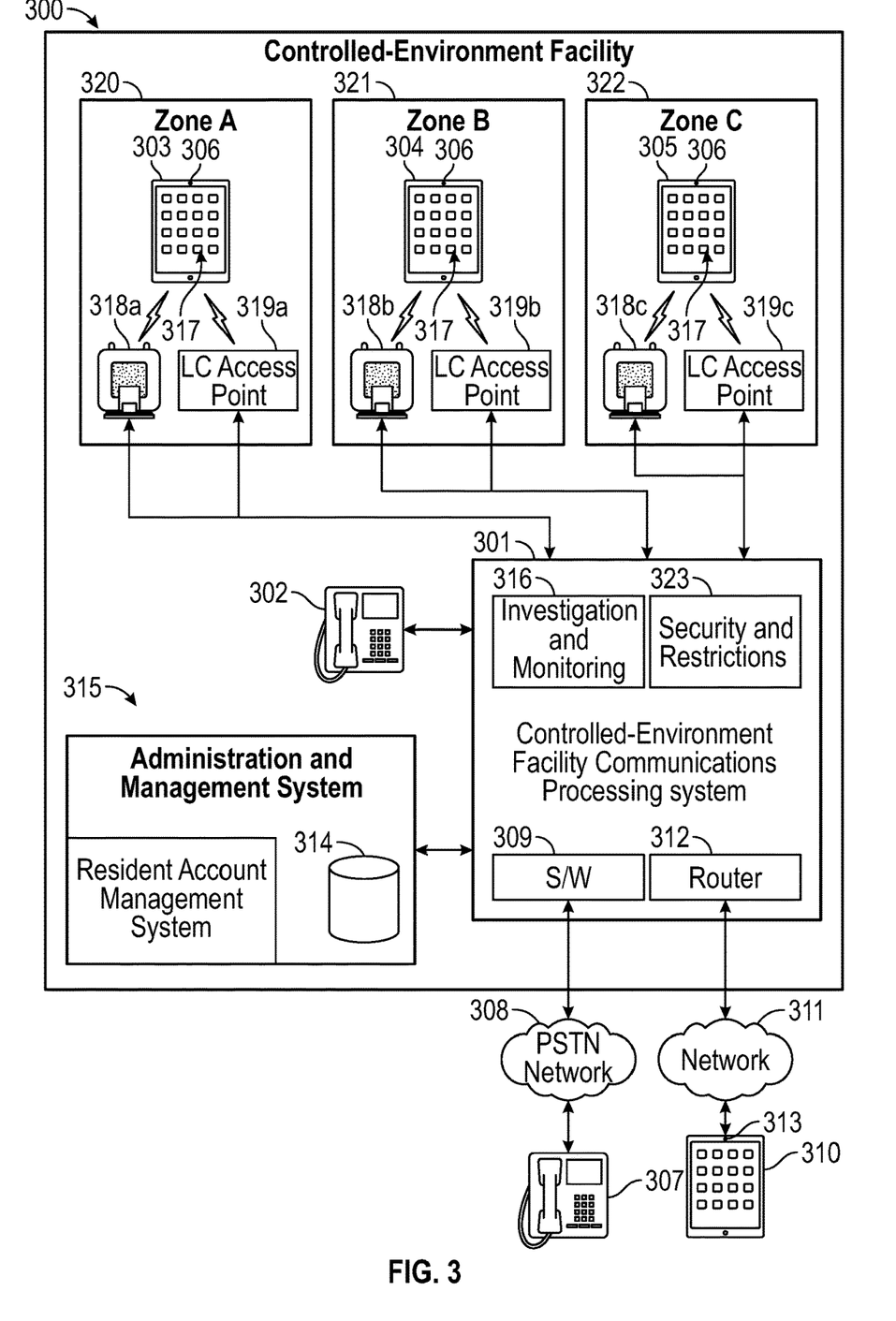
FIG. 3 is a diagrammatic illustration of an example communications environment that uses both RF and LC channels for wireless communication in a controlled-environment facility.

FIG. 3 is a diagrammatic illustration of an example communications environment 300 that uses both RF and LC channels for wireless communication in a controlled-environment facility. Communications processing system 301 may provide telephone services, videoconferencing, online chat, and other communication services to residents of controlled-environment facility 300. In some cases, such as illustrated, communications processing system 301 may be co-located with controlled-environment facility 300. Alternatively, communications processing system 301 may be centrally and/or remotely located with respect to one or more controlled-environment facilities and/or may provide communication services to multiple controlled-environment facilities. More generally, however, it should be noted that communications processing system 301 may assume a variety of forms and may be configured to serve a variety of facilities and/or users, whether within or outside of a controlled-environment facility.

Residents may use more-or-less conventional telephones 302 to access certain communication services. However, in accordance with embodiments of the present systems and methods, residents may also, or alternatively, use personal controlled-environment facility communication and/or media devices 303, 304, 305, referred to herein collectively or individually as an Intelligent Resident Devices (IRD). For example, a resident may use personal controlled-environment facility communication and/or media device 303-305 to place voice calls, as well as for video communication. Such a personal controlled-environment facility communication and/or media device 303-305 may be a personal computer wireless device, such as a tablet computing device or smartphone, which may have been adapted and/or approved for use in controlled-environment facility 300, may be used by controlled-environment facility residents for communication. Such a personal resident device may be referred to as the aforementioned Intelligent Resident Device (IRD) in controlled-environment facilities, in general and/or referred to as an Intelligent Inmate Device (IID) in a correctional institution environment.

As will be appreciated, IRD 303-305, or other similar devices may have video conferencing capabilities such as front-facing camera 306 and a microphone, to enable a party to participate in video communication sessions with other call parties, such as non-residents of the controlled-environment facility, via video communication, secure online chat, etc. Controlled-environment facility personnel, such as correctional facility corrections officers, may, in the performance of their duties, employ personal wireless devices, such as tablet computing devices or smartphones.

As noted, IRDs 303-305 may be tablet computing devices, smartphones, media players, or the similar devices that are adapted and/or approved for use by residents of the controlled-environment facility (i.e., within the controlled-environment facility). Each IRD 303-305 may be particularly adapted for use in a controlled-environment. For example, in a correctional facility, an IRD or IID may have a specially adapted operating system and/or may be "stripped-down," particularly from the standpoint of what application programs (apps) and/or hardware are provided or allowed on IRD 303-305, and/or connectivity afforded such an IRD. For example, such an IRD may employ an operating system kernel built for use in such an IRD in a controlled-environment facility. As a further example, the IRD may be adapted to only connect to a network provided by the controlled-environment facility, and/or in only certain locations within the controlled-environment facility, such as may be controlled by availability of RF or LC access only being available in certain areas. That is, for example, where streaming and/or downloading may be compartmentalized by leveraging the structure of the controlled-environment facility, such as by limiting the availability of an RF signal or LC signals through the placement of wireless access points, modification of RF antenna coverage patterns, or configuration of LC light directionality.

Further, the IRD may allow access to apps or content only upon application of security measures, by the IRD. Such security measures may include determining, by the IRD, DNS spoofing, DNS redirection, use of proxy servers for privacy and security, biometric validation, password validation, radio-frequency identification (RFID), NFC and/or the like. Also, in accordance with embodiments of the present systems and methods video or other services for residents via IRDs 303-305 may be restricted to specific monitored and controlled areas within the controlled-environment facility. Further, in accordance with embodiments of the present systems and methods, the IRD may have a few fixed apps pre-installed on the device, and installation of further apps on the device may be forbidden (i.e. prevented by modifications to the device's operating system) and/or restricted, such as by requiring permission from a facility administrator. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps. Hence, such inmate IRDs may be used to help soon to be released inmate's transition. For example, the IRD may be used to communicate with a future employer. As such, IRDs may be sponsored, or otherwise subsidized by organizations or companies, assisting with the transition of inmates into society.

Correctional facility corrections officers, or other controlled-environment facility personnel, may employ personal wireless devices, such as tablet computing devices or smartphones, in the performance of their duties. These controlled-environment facility personnel devices may be adapted in a manner similar to IRDs and/or IIDs 303-305, and/or otherwise approved, for use within the controlled-environment facility. However, such controlled-environment facility personnel devices may be adapted to prevent use by controlled-environment facility residents and/or to provide the controlled-environment facility personnel some degree of control over the IRDs or IIDs.

In accordance with embodiments of the present systems and methods, controlled-environment facility communications and/or media devices 303-305 may present via a user interface, apps such as: a controlled-environment facility resident calling application, a video visitation application, a controlled-environment facility resident's manual, a controlled-environment facility resident form submittal program, a controlled-environment facility resident commissary ordering application, a music player, a video player, a web browser (which may be limited to only accessing secure websites and/or third party websites of approved vendors), a document reading program, an email application, a Prison Rape Elimination Act (PREA) information document, a PREA hotline, a legal research application, a job search application, a controlled-environment facility resident grievance submittal application, sick call app, education app, weather app, video mail, resident information app, games, a contacts functionality, etc.

In various embodiments, to access communication services, a resident may initiate telephone services by lifting the receiver on telephone 302, and/or otherwise initiating a call, such as by launching a communications app on IRD 303-305 or a fixed point IFD 302. At which time, the resident may be prompted to provide a personal identification number (PIN), other identifying information or biometrics. An IVR unit (not shown, but which may be integrated into communication processing system 301) may generate and play a prompt, or other messages, to the resident on device 302 or 303-305. Under the control of communication processing system 301, devices 302 and 303-305 may be capable of connecting to a non-resident's (i.e., a person not incarcerated or otherwise committed to a controlled-environment facility) telephone 307 across a Publicly Switched Telephone Network (PSTN) 308. For example, telephone 307 may be located at a non-resident's home or office, at a resident visitation center, etc. Switch 309, in communication processing system 301, may be used to connect calls across PSTN 308.

Additionally, or alternatively, the non-resident may communicate using device 310, such as a mobile phone, tablet computing device, or personal computer, that may be connected through an Integrated Services Digital Network (ISDN), Voice-over-IP (VoIP), or packet data network (such as, for example the Internet), or a wireless communications network 311. Router 312 of communication processing system 301 is used to route data packets associated with a call connection to device 310. For example, a non-resident party may have a device 310 with a built-in front-facing camera 313 and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

In addition to providing certain visitation and communication operations, communication processing system 301 may attempt to ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. The PAC/PAN may be a whitelist or a blacklist that identifies contacts that are allowed or restricted for the resident. Each resident's PAC and/or PAN list(s) may be stored, for example, in database 314 maintained by controlled-environment Administration and Management System (AMS) 315. In addition to PAC and/or PAN list(s), AMS 315 may also store Resident Profile Data (RPD), as well as communication and/or visitation rules applicable to each resident. As an example, in the context of a correctional facility, AMS 315 may be referred to as a Jail Management System (JMS). Within the AMS or JMS 315, database 314 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. A controlled-environment facility resident account management system, which may be a separate system, or may be a part or function of AMS 315 may maintain resident accounts for the benefit of the respective resident, such as resident commissary accounts, resident communications accounts, which may be used to pay for communications, such as phone calls, video visitation, internet chats, emails, text messages, etc.

In some implementations, communication processing system 301 may be configured to perform communication investigation and monitoring operations 316, such being configured to monitor and or record communication sessions (e.g., as electronic video files). In scenarios where communication processing system 301 is located within the controlled-environment facility, it may have direct access to AMS or JMS 315. In other embodiments, however, communication processing system 301 may be located remotely with respect to the controlled-environment facility, and access to AMS or JMS 315 may be obtained via a computer network such as, for example, network 311.

Thus, in accordance with embodiments of the present systems and methods, a controlled-environment facility communications and/or media device 303-305 may include at least one processor and a memory coupled to the at least one processor, such as discussed in greater detail below, with reference to the example illustrated in FIG. 1. This memory may be configured to store program instructions executable by the at least one processor. Such program instructions may include a controlled-environment facility communications and/or media device operating system, a controlled-environment facility user interface program, the aforementioned apps, etc. This interface program may include program instructions executable by the at least one processor to cause controlled-environment facility communications and/or media device 303-305 to run the controlled-environment facility user interface on top of, or as part of, the operating system and present apps available for use by a controlled-environment facility user on the controlled-environment facility communications and/or media device. The interface may act as a controlled-environment facility user communications platform, and also or alternatively, provide automated login for interface applications, provide a(n) (interactive) controlled-environment facility bulletin board, etc. The interface may request and accept identification information from the controlled-environment facility user, such as information that may confirm the identity of the user. This identification may be verified, such as through the interface, by controlled-environment facility communications processing system 301 and/or AMS 315 to complete such a login. In accordance with embodiments of the present systems and methods, the interface program instructions may also permit and/or facilitate execution of the apps, such as when one of these apps is selected by the resident, via the displayed interface 317. Further, in accordance with embodiments of the present systems and methods one such app may be a video communications application, such as may facilitate video conferencing or video visitation between a resident and one or more non-residents (or other residents of the same or another controlled-environment facility). As noted, IRDs 303-305 or similar devices may have video conferencing capabilities, such as front-facing camera 306 and a microphone, to enable a party to participate in video communication sessions with other call parties. The interface may also countdown a predetermined amount of time the selected app remains active, a predetermined number of times that an app can be opened, a predetermined number of times that a form can be submitted, a predetermined time an app remains open and/or is executed, multi-tasking functionality between open apps, etc.

In accordance with embodiments of the present systems and methods a controlled-environment facility communications system may include controlled-environment facility communications and/or media devices 303-305 controlled-environment facility communications processing system 301, and/or controlled-environment facility administration and management system 315. Therein, inward facing connectivity from and to controlled-environment facility communications processing system 301 extends from and to controlled-environment facility resident media devices 303-305 such as via RF access points 318 and LC access points 319. Hence, the internal controlled-environment facility connectivity may include RF and LC connectivity disposed in corresponding zones 320, 321, 322 of the controlled-environment facility to provide access by controlled-environment facility resident media devices 303-305 disposed in that portion of the controlled-environment facility. These specific areas may be monitored and/or controlled in accordance with embodiments of the present systems and methods. As noted, these specific monitored and controlled areas are referred to herein as "zones." However, such a zone could be any zone within the facility that is defined to a location. For example, the zones discussed herein may include a law library zone, gaming zones, phone call zones, commissary/ordering zones, training/education zones, homework zones, religious zones, etc.

Consistent with the foregoing, where the controlled-environment facility is a correctional facility, a zone 320-322 may be established in a portion of the correctional facility, such as a resident housing unit, which may be referred to as a pod, section, unit, dormitory, or block, for example. The housing units may be distributed across different buildings, wings, or floors of controlled-environment facility 301. Controlled-environment facility 301 also comprises various common spaces, such as dining halls, recreation areas, medical facilities, laundry room, yard (outside), dayrooms, exercise facilities, that may also be designated as separate zones 320-322. In a correctional facility embodiment, multiple RF and LC wireless access points 318 and 319 may be disposed in each zone 320-322 of correctional facility 300 to provide access by inmate media devices 303-305.

In some embodiments, due to the nature of the construction (e.g., steel or steel-reinforced concrete) and/or layout (e.g. radiating pod structure) of a correctional facility, coverage from a particular RF wireless access point 318 should be contained to the zone in which it is installed, and hence only reach resident devices located in that zone and be more-or-less isolated from devices in other zones. In other embodiments, signals from RF wireless access points 318 may extend across multiple zones 320-322. Coverage from LC wireless access points 319 is limited by the broadcast light signals and, therefore, is typically limited to the particular zone 320-322 in which the LC access point is located.

Embodiments allow a controlled-environment facility to manage how wireless communication devices are used and to monitor where the devices are located within the facility. When compared to prior RF-only devices, wireless communication devices having both RF and LC capabilities provide a controlled-environment facility with increased bandwidth to provide information to residents as well as more precise control over locations wherein the devices and/or features are operable.

A wireless communication device may be operational only in a specified zone of controlled-environment facility 300. Such a geofencing restriction may be based upon the device itself and/or the resident who is using the device (e.g., the logged-in user). Geofencing would allow the staff at facility 300 to restrict a specific group of devices 303 to operate only within zone 320, for example. In this situation, if a device 303 was moved to zone 321, then device 303 would not function (or would have limited function) no matter which resident was logged-on to the device. The staff at facility 300 may also restrict a specific group of residents to using any device only within zone 320. In this situation, if a resident is assigned to zone 320 (e.g., the resident's home POD or classroom), then any device and/or feature that the resident logs into in zone 321 would not function (or would have limited function) whether or not the device 304 was assigned to zone 321 or the device 303 was improperly moved to zone 321. The geofencing restriction may be controlled using LC.

Communication processing system 301 may be configured to perform communication security and restrictions 323, such as to ensure only authorized media devices 303-305 and users access the system and/or to limit which zone 320-322 will support specific media devices 303-305 and users. Security and restrictions 323 may further limit or control whether a particular media device 303-305 is able to communicate via RF and/or LC communication channels. Security and restrictions module 323 may be used to track devices 303-305 across different zones 320-322 of controlled-environment facility 300 and to approve or deny operations in each zone. For example, security and restrictions module 323 may verify that the currently logged-in resident is approved to use device 303 and that both the resident and device are approved for use in the current zone 320. Security and restrictions module 323 may further track devices 303-305 across different zones 320-322 of facility 300 and may send an alert, such as by notifying investigation and monitoring module 316, when a device 303-305 or a current user is located in an unauthorized zone and/or when a current user is not authorized to use the device to which they have logged-in.

In an example embodiment, referring to FIG. 2, wireless communication device 201 may be restricted to operating only in attocell 217, which would require communicating with LC access point 214. This restriction may be tested at login and/or periodically during use, and device 201 would allow resident use only if the device was currently within an approved attocell. For example, when device 201 is booted up and/or when a resident logs-on, device 201 attempts to communicate via the LC operating frequencies LC access point 214 to verify that it is within an approved area 217. If device 201 is within attocell 217, then communication with LC access point will be possible and the device may function normally. However, if device 201 is within attocell 219, then communication with LC access point 214 will not be possible since device 201 is outside the region of attocell 217. Moreover, communication between device 201 and LC access point 216 may not be possible at all if access point 216 uses a different set of LC operating frequencies than LC access point 214 (i.e., if the LC bands assigned to LC access point 214 and LC access point 216 are different).

In another embodiment, a central component, such as router 220, may be able to identify which LC access point 214 or 216 is communicating with a device 201 by observing packet transmissions or other data flowing from the LC access points. If the central component determined that device 201 was communicating with an unassigned or unauthorized LC access point 216, then the central component may block further data to or from device 201. Either the central component or the LC access point may alert staff at the controlled-environment facility that the device is being used in an unapproved area.

In an example use case, a resident may be assigned a wireless communication device 201 for a video visitation session. The resident may also be assigned a particular location 217 in which to conduct the video visitation session. The location 217 may comprise a particular seat, cubical, or room that has been designated for video visitation use, such as to provide resident privacy or to allow monitoring by controlled-environment facility staff. The resident will be allowed to initiate and conduct the video visitation session as long as device 201 remains within assigned location 217, which is determined by verifying that device 201 and LC access point 214 can communicate over LC channels. If device 201 is communicating with LC access point 216 instead, then the video visitation session will be terminated since location 219 was not assigned to the user for this session. Controlled-environment facility staff, such as an investigator, may be notified when a video visitation session is attempted in an unauthorized area. Alternatively, the video visitation session may be allowed to proceed in an unauthorized area but may be recorded and/or monitored for later evaluation and investigation.

In other embodiments, device 201 may be restricted to location 217 for other uses, such as playing games, using entertainment applications, and/or accessing training/educational applications only in approved locations 217 in communication with LC access point 214.

LC access points may also be used to identify the current location of a wireless communication device. For example, LC transmitters 204 and 206 may broadcast unique signals that identify the associated device 201 or 202. The signal may be broadcast either periodically or on demand (e.g., when triggered by an application). The signal may further report a status of the associated device, such as a currently logged-on user, available battery life, currently installed and/or in-use applications, or other operating conditions. LC access points 214, 215, and 216 monitor LC channels for these identity signals. When an identity signal is detected, the detecting LC access point knows that the device is within the corresponding attocell 216, 217, or 218 for the LC access point. The identity and location of the device may be reported to a tracking application or other location-sensitive application. In one embodiment, when a device is detected in an attocell, content specific to the attocell location is provided to or otherwise enabled for the device. For example, if the attocell is associated with a classroom, educational content may be enabled; if the attocell is associated with a cafeteria, a current menu may be pushed to the device; if the attocell is associated with a medical facility, an intake form may be triggered. Both commercial (e.g., targeted sales) and non-commercial content may be triggered based upon a device's location as detected using LC access point coverage areas.

In further embodiments, LC is used to provide bandwidth in addition to bandwidth available using RF communications. Such additional bandwidth may or may not be associated with location verification techniques as discussed above. Referring to FIG. 3, communication between wireless device 303 and communication processing system 301 is conducted using both RF access point 318a and LC access point 319a. The distribution of bandwidth or load sharing between RF access point 318a and LC access point 319a may be predetermined or may be determined in real time based upon current operating conditions, for example.

In the video visitation example use case, a resident may be assigned wireless communication device 330 for a video visitation session. RF access point 318a may be used to setup or establish the video visitation session with a remote user on device 310. The setup process may include designating certain LC channels on LC access point 319a that will support the video visitation session (i.e., carry the video and audio packets associated with the video visitation session). The alternative may also occur, such as using LC access point 319a to setup a video visitation session and using RF access point 318a to support the actual video visitation session data.

In another example embodiment, RF access point 318a may support one side of the video visitation session (i.e., uplink to, or downlink from, device 303) while LC access point 319a supports the other side of the session. In a further example, RF access point 318a and LC access point 319a may share responsibility for carrying video visitation session data either equally or based upon available bandwidth and/or speed.

Figure 4:
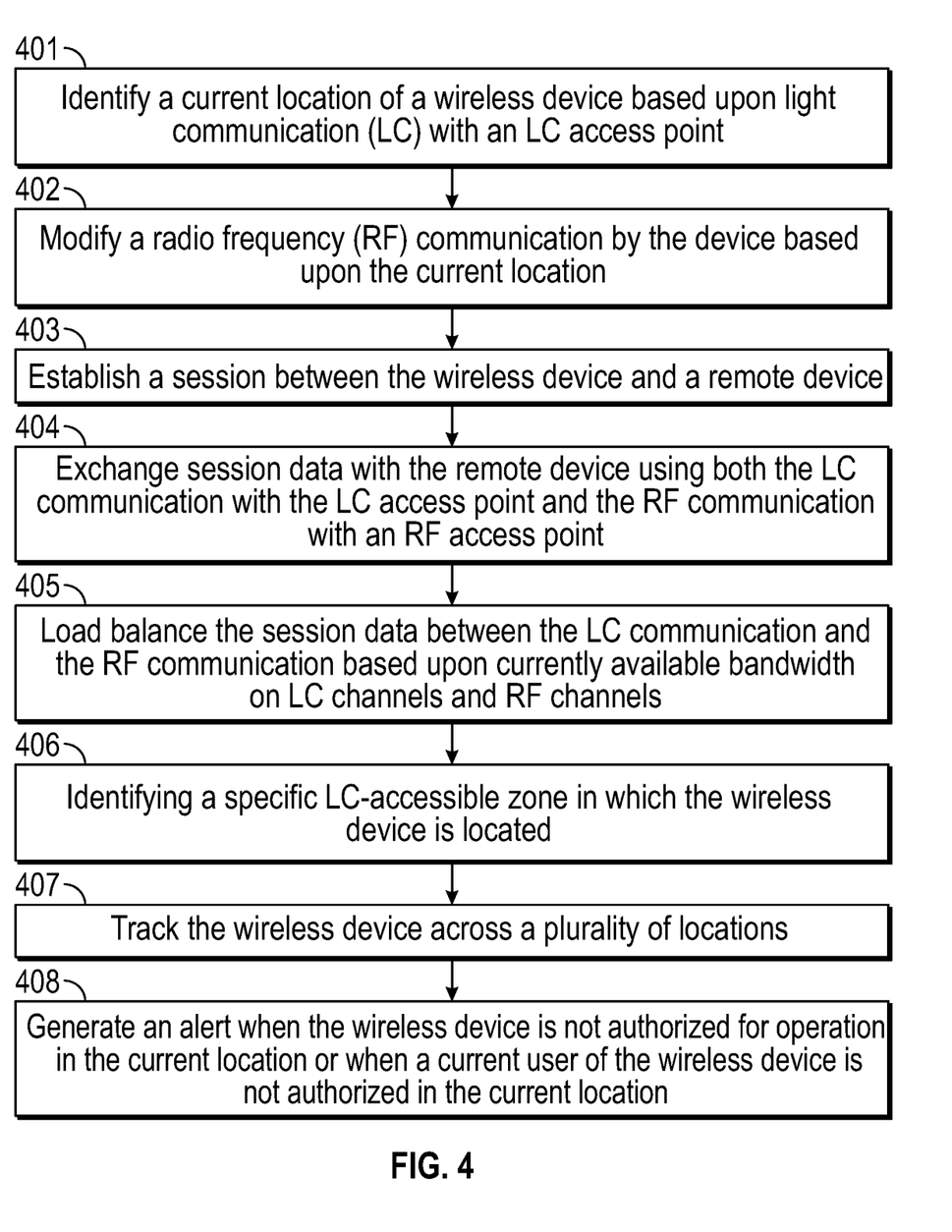
FIG. 4 illustrates an example process for operating a dual LC and RF communication system device.

FIG. 4 illustrates an example process for operating a dual LC and RF communication system device. In step 401, a current location of a wireless device is identified based upon light communication with an LC access point. In step 402, RF communication by the device is modified based upon the current location. Modifying RF communication by the device may include, for example, enabling and/or disabling one or more selected applications on the device based upon the current location.

In step 403, a session is established between the wireless device and a remote device. In step 404, session data is exchanged with the remote device using both the LC communication with the LC access point and RF communication with an RF access point. In step 405, session data between the LC communication and the RF communication is load balanced based upon currently available bandwidth on LC channels and RF channels.

In an embodiment, the wireless device may be configured for use in a controlled-environment facility, such as by having an operating system and/or applications that are specially adapted for the controlled-environment facility. The controlled-environment facility has a plurality of separate LC-accessible zones. In step 406, a specific LC-accessible zone is identified based upon where the wireless device is located. Each LC-accessible zone may be supported by a different LC access point. The LC access points may be defined by separate light transmitters, for example, or by using separate light bands. Two or more LC-accessible zones may overlap at least in part, such as where different LC access points broadcast light in overlapping areas.

In step 407, the wireless device is tracked across a plurality of locations. Each of the plurality of locations may be associated with a different LC access point light transmitter. In step 408, an alert is generated when the wireless device is not authorized for operation in the current location or when a current user of the wireless device is not authorized in the current location.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

What is claimed is:

1. A method, comprising:
prompting a user of a wireless device to provide identifying information;
verifying the identifying information provided by the user;
identifying a current location of the wireless device based upon light communication (LC) with an LC access point;
enabling one or more selected applications on the device based upon the verified identity of the user and the current location of the device;
establishing a session between the wireless device and a remote device; and
exchanging session data with the remote device using both the LC communication with the LC access point and the RF communication with an RF access point, wherein one side of the session data is supported by the LC access point and the other side of the session data is supported by the RF access point.

2. The method of claim 1, further comprising:
load balancing the session data between the LC communication and the RF communication based upon currently available bandwidth on LC channels and RF channels.

3. The method of claim 1, wherein the wireless device is adapted for use in a controlled-environment facility, and wherein the controlled-environment facility has a plurality of separate LC-accessible zones, and wherein identifying the current location of the wireless device further comprises:
identifying a specific LC-accessible zone in which the wireless device is located.

4. The method of claim 3, wherein each LC-accessible zone is supported by a different LC access point.

5. The method of claim 4, wherein two or more LC-accessible zones overlap at least in part.

6. The method of claim 1, further comprising:
tracking the wireless device across a plurality of locations, wherein each of the plurality of locations are associated with a different LC access point light transmitter.

7. The method of claim 1, further comprising:
generating an alert when the wireless device is not authorized for operation in the current location.

8. The method of claim 1, further comprising:
generating an alert when a current user of the wireless device is not authorized in the current location.

9. A method, comprising:
prompting a user of a wireless device to provide identifying information;
verifying the identifying information provided by the user;
identifying a current location of the wireless device based upon light communication (LC) with an LC access point; and
disabling one or more selected applications on the device based upon the verified identity of the user and the current location of the device;
establishing a session between the wireless device and a remote device; and
exchanging session data with the remote device using both the LC communication with the LC access point and the RF communication with an RF access point, wherein one side of the session data is supported by the LC access point and the other side of the session data is supported by the RF access point.

10. A method, comprising:
prompting a user of a wireless device to provide identifying information;
verifying the identifying information provided by the user;
identifying a current location of the wireless device based upon light communication (LC) with an LC access point;
disabling one or more selected applications on the device based upon the verified identity of the user and the current location of the device;
establishing a session between the wireless device and a remote device; and exchanging session data with the remote device using both the LC communication with the LC access point and the RF communication with an RF access point, wherein the LC access point is used to set up the data session and the RF access point is used to support the data session.

11. The method of claim 1, wherein the LC access point is used to upload data to the wireless device and the RF access point is used to download data to the wireless device.

12. The method of claim 1, wherein the RF access point is used to upload data to the wireless device and the LC access point is used to download data to the wireless device.

\* \* \* \* \*